United States Patent [19]

Kummerfeldt et al.

[11] Patent Number: 4,816,906
[45] Date of Patent: Mar. 28, 1989

[54] METHOD FOR MOTION-COMPENSATED FRAME-TO-FRAME PREDICTION CODING

[75] Inventors: Georg Kummerfeldt, Neu-Ulm; Franz May; Winfrid Wolf, both of Ulm, all of Fed. Rep. of Germany

[73] Assignee: AEG Aktiengesellschaft, Ulm, Fed. Rep. of Germany

[21] Appl. No.: 90,875

[22] Filed: Aug. 31, 1987

[30] Foreign Application Priority Data

Aug. 29, 1986 [DE] Fed. Rep. of Germany ....... 3629472

[51] Int. Cl.$^4$ .............................................. H04N 7/12
[52] U.S. Cl. ..................................... 358/136; 358/135
[58] Field of Search ..................... 358/136, 135, 105; 375/27

[56] References Cited

U.S. PATENT DOCUMENTS

| | | | |
|---|---|---|---|
| 4,278,996 | 7/1981 | Netravali et al. | 358/136 |
| 4,437,119 | 3/1984 | Matsumoto et al. | 358/136 |
| 4,460,923 | 7/1984 | Hirano et al. | 358/136 |
| 4,562,468 | 12/1985 | Koga | 358/136 |
| 4,571,618 | 2/1986 | Hatori et al. | 358/136 |
| 4,575,756 | 3/1986 | Furukawa | 358/136 |
| 4,591,908 | 5/1986 | Hirano | 358/136 |
| 4,679,079 | 7/1987 | Catras et al. | 358/136 X |
| 4,698,672 | 10/1987 | Chen et al. | 358/136 |
| 4,723,161 | 2/1988 | Koga | 358/136 |

FOREIGN PATENT DOCUMENTS 0123616 3/1987 European Pat. Off. .
3328341 2/1985 Fed. Rep. of Germany .

OTHER PUBLICATIONS

Coding Television Signals at 320 and 64 kbit/s, G. Kummerfeldt, F. May, W. Wolf, Dec. 1985.
Picture Coding with Motion Analysis for Low Rate Transmission, Franz May, Winfrid Wolf, Jun. 1982.
Displacement Measurement and Its Application in Interframe Image Coding, Jaswant R. Jain, et al., Dec. 1981.

*Primary Examiner*—John W. Shepperd
*Assistant Examiner*—Victor R. Kostak
*Attorney, Agent, or Firm*—Spencer & Frank

[57] ABSTRACT

A process of frame-to-frame prediction coding in which a frame is broken down into a regular block scanning field of n x n pixels and then prior to each prediction, up to four prediction methods, namely (1) block-by-block displacement vector calculation, (2) object-related displacement vector calculation, (3) nullification of the displacement, and (4) nullification of the prediction, are monitored as to the data rate to be transmitted, and the prediction method that leads to the smallest prediction errors is selected for the transmission.

13 Claims, 2 Drawing Sheets

FIG. 1
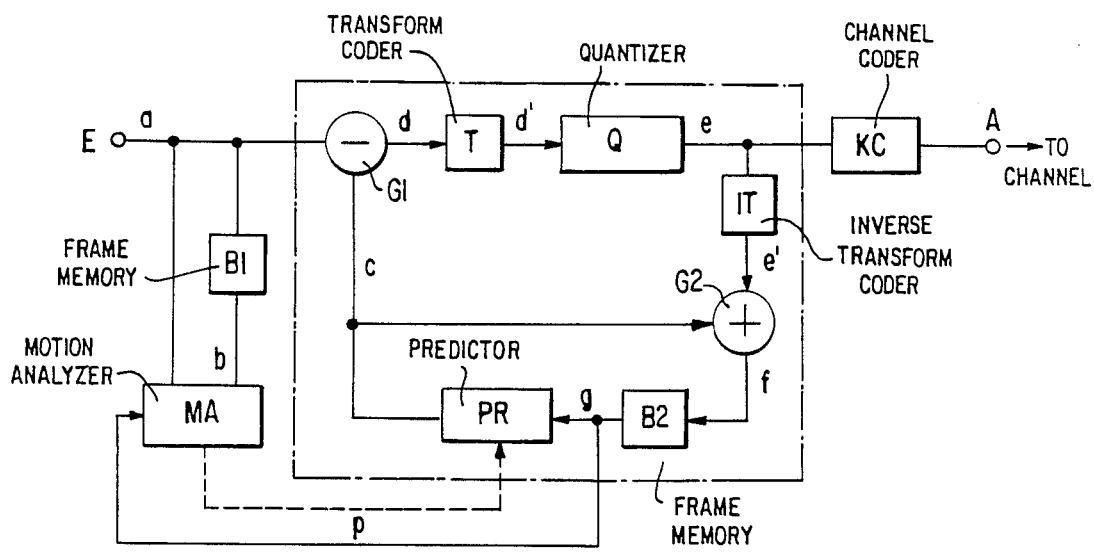
FIG. 3
FIG. 2
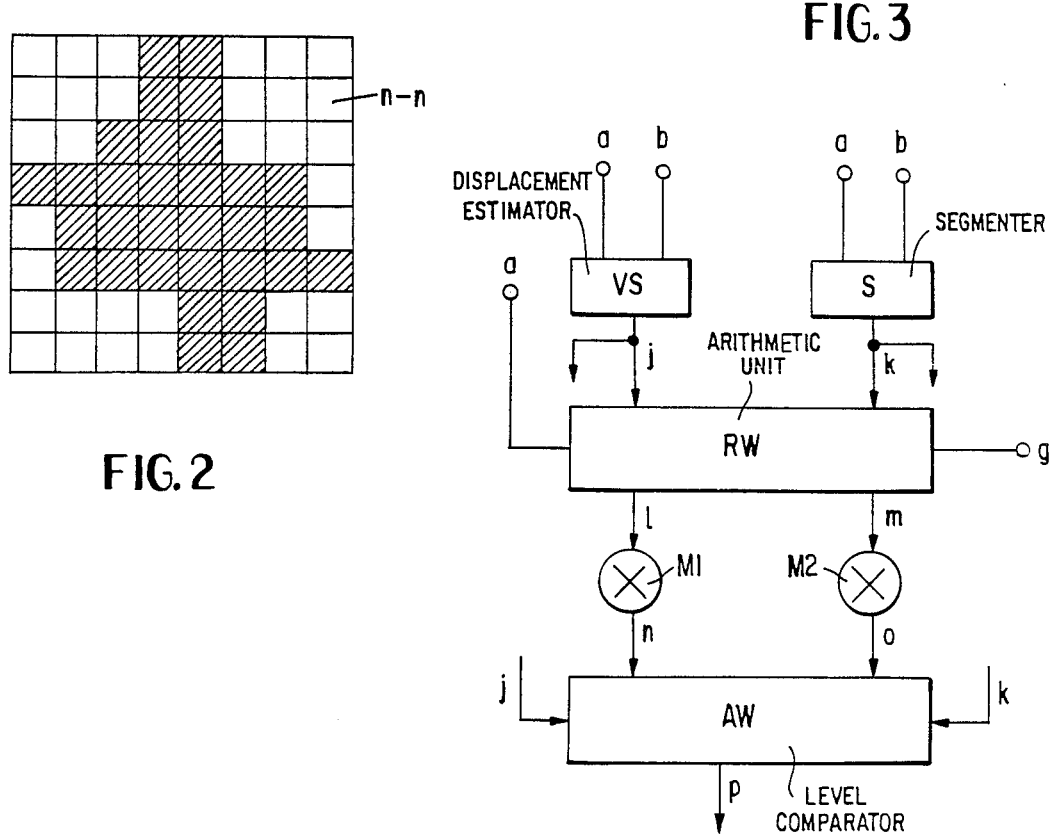

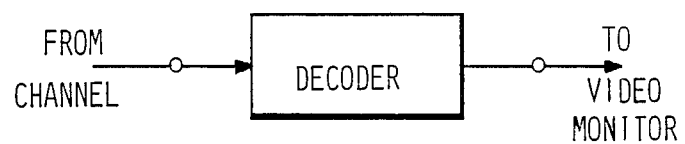
FIG. IA

METHOD FOR MOTION-COMPENSATED FRAME-TO-FRAME PREDICTION CODING

BACKGROUND OF THE INVENTION

1. Field of the Invention

The invention relates to a method of prediction coding utilizing advance knowledge that is already present in a video receiver in order to describe a current frame with as little information as possible, and more particularly to an improved method of prediction coding in which the frame-to-frame changes resulting from motion in a scene depicted in a frame are detected spatially and temporally and also included in the calculation of the predicted frame, that is, prediction coding with motion compensation.

2. Prior Art

For transmission of video telephone scenes at transmission rates between 64K bit/s and 384K bit/s, two methods of motion compensation have proved to be particularly successful. The first method for motion compensation, known for example from European patent No. 0 123 616, is block-by-block motion compensation. It schematically scans through the entire current frame to be predicted (this is known as iconic frame processing), dividing the frame into a regular block of n×n pixels and assigning to each block the frame-to-frame displacement for which an interval measurement (correlation measurement) between the gray value pattern of the observed block and the gray value pattern of a correspondingly displaced block in the previous frame assumes a minimum (maximum). For prediction, a block from the most recently reconstructed frame (already present at the receiver) is used, which is offset with respect to the block to be predicted by the ascertained displacement.

The other method is object-related motion compensation. It is known, for instance, from German Patent Disclosure Document DE-OS No. 33 28 341. In principle it operates not schematically but rather in terms of picture content (known as semantic frame processing), in which the attempt is made to separate portions of the frame sequence that have moved from those that have not moved, and to characterized them in terms of their movement behavior, and in this manner to attain self-contained objects, defined with respect to one another, having a describable movement behavior, and finally, with the aid of the description of the movement behavior obtained, to provide a motion-compensated predicted frame of the current frame. This method is also known as object matching. For further information on this prior art, see among others the paper entitled "Coding Television Signals at 320 and 64K bit/s" (Second Int. Tech. Symp. on Optical and Electro-Optical Appl. Science and Engineering, SPIE Conf. B594 Image Coding, Cannes, France, Dec. 1985).

Codes for the extreme reduction of the transmission rate, which are required for the above-mentioned bit rates, for example, must be adapted to a restricted scene material that they have to process. Accordingly they cannot be universally used, nor can they be evaluated with respect to arbitrary scenes. It is characteristic of video telephone scenes and video conference scenes that there are variations in the regularity of the frame-to-frame changes between large-area variations, such as when zooming by increasing the focal length of the camera lens, and predominantly random variations, such as those presented by a person making large gestures with rapidly changing facial expressions, who is moreover wearing highly patterned clothing with a great amount of drapery.

Each of these two methods for motion compensation reveals its weaknesses completely when such extreme changes are coded. This will be explained below with respect to three criteria for quality.

A first criterion for quality of motion compensation is the ratio of the square deviation, averaged over all pixels, for either the motion-compensated predicted frame or the most recently reconstructed frame of the current original frame.

Object-related motion compensation attains the greatest yield in the prediction of frame-to-frame changes, which are brought about by motion of large objects in the scene space, which predominantly obey the laws of translation in the scene space: lateral, forward or backward movements of the entire reproduced portion of an otherwise unmoving person. In the case where the camera is panning or zooming, object matching motion compensation is advantageous, because all the pixels already present in the previous frame appear once again, displaced, in the current in accordance with a uniform, simple principle.

Block-by-block motion compensation, contrarily, is advantageous when there are random frame variations.

The second decisive criterion of quality for motion compensation is the data rate required for transmitting the control data for the motion-compensated predictor and for transmitting the so-called prediction error signal for correcting the errors remaining in the predicted frame.

While in object matching a set of control data (known as the characteristic motion vector) for each closed moved object can be transmitted with the accuracy of at least 1/10 pixel interval in order to enable optimal motion-compensated estimated frame calculation, this is impossible with block matching, because block matching requires the transmission of a displacement vector for each block that has varied from one frame to the next. This would increase the control data flow excessively, to the disadvantage of the transmissible prediction error signal. Consequently, the only realizable block displacements are integral multiples of the pixel interval in each coordinate direction, with the consequence of a smaller yield from motion compensation.

A third criterion of quality, which in contrast to the two objective criteria given above is a subjective criterion of quality, is the errors still remaining in the reconstructed frame that have not been corrected because of the limited data rate. Among these remaining errors, those that are considered disruptive are those which by misadaptation of the rigid block structure to the natural limits of the various moved portions of the frame are artificially introduced into their reconstructed frames and are therefore also called artefacts.

In object matching, these artefacts occur only at the boundaries of the closed objects, while in block matching they basically can occur anywhere that differently motion-compensated blocks are adjacent one another.

SUMMARY OF THE INVENTION

It is the object of the invention to improve the prior art methods of motion-compensated frame-to-frame prediction coding. In particular, the method of the invention is one in which initially a total frame is broken down into a regular block scanning field of n×n pixels, and for each of these blocks the displacement vector as compared with the blocks of the previous frame is ascertained by interval calculation, and with which the data rate for the transmission of frame signals, in particular for a picture telephone or video telephone, can be further restricted and/or the transmitted image quality can be improved. The improvements are attained by the method steps in accordance with which adjoining blocks for which a displacement not equal to 0 has been ascertained are combined into complexes, and from the measured displacements of the blocks that belong to one complex, the parameters of the motion principle (e.g., rotation, translation, expansion, contraction) are calculated by regression calculation, and the estimated frame (predicted frame) calculation is performed with the aid of the individual block displacements resulting from the motion principle.

The method according to the invention avoids the weaknesses of block-wise and object-related motion compensation which occur when only one combination is used exclusively. It makes use of the fact that the two methods advantageously supplement one another and it determines the most favorable compromise between them. As a result, an improvement of the average yield from motion compensation is obtained as compared with pure object matching, as well as a reduction in the mean control data rate for transmitting the motion vectors and a reduction of the artefacts as compared with pure block matching. Even though the yield from motion compensation is higher, at a lower data rate for transmitting motion vectors and with fewer artefacts in the predicted frame, a greater proportion of the allowed data rate still remains on the average for transmitting the prediction error signal; as a result, the objective and subjective quality of the image received is higher.

In accordance with one embodiment of the invention, it is ascertained by interval calculation for each block whether (1) the measured block displacement or (2) the block displacement resulting from the parameters of the motion principle, produces a smaller prediction error, and using that displacement that leads to the smallest prediction error for the motion compensation is used. In an alternate embodiment of the method, it is additionally ascertained whether no displacement, or a nullification of the prediction, leads to smaller prediction errors, and for the estimated frame calculation, the particular rule of the four prediction rules that produces the smallest prediction error is ascertained and used.

Another feature of the invention is that prior to the selection of a prediction rule, a weighting is performed in favor of the calculation of the predicted frame in accordance with the motion principle ascertained for the total complex.

In accordance with one embodiment of the method, the parameters of the motion principle are calculated solely from ascertained displacements of corners in the contents of the frame.

In accordance with another feature of the invention, using the selected and transferred displacement vectors from the decoder, a correct-motion interpolation of possibly uncoded and untransmitted partial and full frames is performed. formed.

BRIEF DESCRIPTION OF THE DRAWINGS

These and other features and advantages of the invention which provide further improvement to the transmitted image at the lowest possible data transmission rate will be more completely understood from the following detailed description of the preferred embodiment in conjunction with the appended drawings in which:

FIG. 1 is a block circuit diagram of a coder for performing a motion-compensated frame-to-frame prediction according to the invention;

FIG. 1A is a block diagram illustrating the coupling of the decoder to the output channel of the coder.

FIG. 2 shows frame blocks and block complexes; and

FIG. 3 is a block circuit diagram of a motion analyzer for performing the method of the invention with the apparatus shown in FIG. 1.

DESCRIPTION OF THE PREFERRED EMBODIMENTS

FIG. 1 shows the block circuit diagram of a conventional DPCM (differential pulse code modulation) coder with motion compensation. The DPCM loop is located inside the area bounded by broken lines.

The video signals c of the estimated frame calculated by the predictor PR are subtracted from the video signals a of the original frame arriving at the input E. The prediction errors d resulting from the subtraction are transformed into their spectral components d' via the transformation device T and supplied via a quantizer Q as quantized video signals e to the channel coder KC and then to the output A. Also, the signals c of the estimated frame and the inversely transformed (via inverse transform coder IT) quantized video signals e' are added together and supplied once again to the predictor PR via a frame memory B2 in the form of video signals g that are retarded by one or more frame intervals, specifically in the form of an estimated frame for the current frame now present. The DPCM loop as a rule also contains a transformation device T, particularly suitable for frame signals, for data reduction which is inverted by the second transformation device IT for the signals for estimated frame correction (known as inverse transformation). Cosine transformation has proved particularly valuable for transformation coding.

In addition to this DPCM loop, known per se, a device MA (motion analyzer) is provided for ascertaining frame variations of successive frames. To this end, it receives the signals a of the original frame and, via a frame memory B1, the signals b of the previous frame. Thus, each of the frame memories B1 and B2 retards one frame by the duration of one frame interval.

The expansion of the structure, shown only for the coder, as compared with conventional frame-to-frame prediction resides in the control of the predictor PR by means of a segmenter, provided in the motion analyzer MA and a displacement estimator, also provided in the motion analyzer. The segmenter furnishes the information as to which blocks of pixels the predictor is to predict, and the displacement estimator furnishes the displacement or motion information for motion-compensated predictions. From comparison of the previous frame (b) and the current original frame (a), segmentation and displacement or motion information is obtained.

FIG. 2 schematically shows the product of a segmenter, which in the block-scanned frame, firstly, detects blocks that have changed as a result of movement in the scene (shown shaded in the drawing) and, secondly, combines adjacent changed blocks into complexes (outlined by solid lines). Such complexes can represent closed, self-contained regularly moved objects, but can also be produced by a great number of differently moved frame areas close to one another.

The selection method explained below will select object-related motion compensation in the first case and block-by-block motion compensation in the second. In general, the two extremes of types of motion do not arise so frequently; mixed forms are the rule. The selection method ascertains on the one hand the most favorable combination of a proportion of individual blocks displaced independently from one another and on the other hand a proportion of blocks the pixels of which have been displaced in accordance with a common movement principle of the object moved in the scene.

In accordance with the invention the most favorable combination of the two methods or rules, known per se, of motion compensation—that is block-by-block and object-related motion compensation—is attained in that for all the blocks that have been displaced from one frame to another because of motion in the scene, first their displacement is ascertained, and then for cohering complexes of displaced blocks a common motion principle, representing the motion of a closed object in the scene, is derived, and third, monitoring is again performed one block at a time as to whether an individual block displacement, or a displacement following the principle of object motion of all the pixels of the blocks of the complex examined produces the lesser deviation of the predicted frame from the actual original frame to be transmitted.

The deviation is ascertained by means of a suitable interval measurement. In the event of approximately equal prediction quality, object-related motion compensation is unambiguously given preference, because it is most favorable overall in terms of the amount of control data required and in terms of the artefacts. The errors in the predicted frame can be corrected better with object-related motion compensation because more of the data rate is available for the prediction error signal.

FIG. 3 shows a block diagram of the motion analyzer MA, shown in FIG. 1, for performing the selection method for block-by-block and object-related motion compensation. The displacement estimator is shown at VS and the segmenter at S. The data j of the displacement vectors per block and per complex and the data k of the complexes of changed blocks are supplied to an arithmetic unit RW. In this regard it is to be noted that complexes are ascertained on cohering single blocks with displacements not equal to zero. Therefore, each individual block with non-zero displacement automatically belongs to a complex. The displacement vectors per block and the displacement vectors calculated from the motion principle of a complex which is based on the block displacements can differ for a single block under consideration.

From the measured displacements of the individual blocks and/or from displacement vectors, ascertained in the entire complex, of particularly emphasized points in the gray value pattern, which can be readily and unambiguously relocated in the previous frame, a motion principle or type of motion is derived according to which all the pixels of the complex can be predicted in a motion-compensated manner. The complex is now monitored block by block to determine whether the prediction is better with block-by-block motion compensation or with object-related motion compensation. To this end, each block of the predicted frame must be calculated both using block-by-block motion compensation and using object-related motion compensation.

One block of the predicted frame is obtained in a simple fashion using block-by-block motion compensation, in that the components of the displacement vector ascertained for the block are rounded off to an integral multiple of the pixel interval, and in that the block offset by this displacement in the last reconstructed frame is inserted as a block of the predicted frame. In object-related motion compensation, all the pixels of one block of the predicted frame are formed such that using a displacement vector, calculated in accordance with the motion principle derived for the entire complex with an accuracy of at least 1/10 pixels, transferred on the basis of the coordinates of the observed pixel into the most recent reconstructed frame, a gray value is interpolated there from the surrounding region of $2 \times 2$ pixels and is inserted for the observed pixel of the predicted frame.

Finally, for each of the calculated versions of one block of the predicted frame, the interval between its gray value course and the gray value course of the current original frame is calculated (signals 1 and m), and the more favorable version is selected. The decision is then weighted in favor of the object-matched motion compensation by means of the two multiplier elements M1 and M2, to produce weighted outputs n and o because if there is approximate equal quality with the block matched motion compensation, the object matched motion compensation has the advantage of a smaller control data requirement and of lesser artefact formation, as explained above. The selection is made in the unit AW, the output signal P of which controls the predictor PR (FIG. 1) and supplies it with the data, for instance j or k, required for prediction in accordance with the selection made.

In the preferred embodiment of the invention, the elements VS, S, RW and AW are constituted by a conventional microprocessor which performs the calculating functions of the elements described above.

The present disclosure relates to the subject matter of our patent application No. P 36 29 472.1 filed in the Federal Republic of Germany on Aug. 29, 1986, the entire specification of which is incorporated herein by reference.

It is to be understood that various other modifications will be apparent to (and can readily be made by) those skilled in the relevant art without departing from the scope and spirit of this invention. Therefore, it is not intended that the scope of the claims appended hereto be limited to the description as set forth herein, but rather that the claims be construed as encompassing all the features of patentable novelty.

What is claimed is:

1. In a method of motion-compensated frame-to-frame prediction coding, wherein prediction errors are coded by and transmitted from a channel coder and the prediction errors are calculated as a function of the signal content of a current frame and a prior frame with a predictor element, the method including breaking down the entire current frame into a regular block scanning field of blocks of $n \times n$ pixels and ascertaining by interval calculation directional displacements for each block relative to respective blocks of a previous frame, the improvement comprising the steps of:
   combining adjoining blocks for which the directional displacements ascertained by interval calculation are not equal to zero into respective complexes of blocks,
   calculating by regression calculation parameters of a motion principle of one of the complexes from the respective directional displacements ascertained by interval calculation of the blocks which belong to the respective one of the complexes, calculating an estimated frame with the aid of individual block displacements derived from the regression calculation parameters of the motion principle of the one of the complexes, and controlling the predictor element with the aid of the estimated frame calculation.

2. A method as in claim 1, wherein said step of calculating the estimated frame includes the steps of ascertaining by interval calculation for each block whether the ascertained directional displacement for each block or the block displacements derived by regressive calculation of the parameters of the motion principle produces a smaller prediction error in the location of the block relative to the actual location of a corresponding block in the current frame, ascertaining whether no displacement or a nullification of a prediction of the location of the block in the estimated frame produces a smaller prediction error, and for the calculation of each block of the estimated frame, ascertaining and using the one of the ascertained directional displacement for each block, the block displacement derived by regressive calculation of the parameters of the motion principle, no displacement or a nullification of a prediction of the location of the block in the block in the estimated frame, which produces the smallest prediction error.

3. A method as in claim 1, further comprising the step of performing a correct-motion interpolation of possibly uncoded and untransmitted partial and full frames using selected and transferred displacement vectors from a decoder to which the signal is being sent.

4. In a method of motion-compensated frame-to-frame prediction coding, wherein prediction errors are coded by and transmitted from a channel coder and the prediction errors are calculated as a function of the signal content of a current frame and a prior frame with a predictor element, the method including breaking down the entire current frame into a regular block scanning field of blocks of n×n pixels and ascertaining by interval calculation directional displacement for each block relative to respective blocks of a previous frame, the improvement comprising the steps of:

combining adjoining blocks for which the directional displacements ascertained by interval calculation are not equal to zero into respective complexes of blocks, calculating by regression calculation parameters of a motion principle of one of the complexes from the respective directional displacements ascertained by interval calculation of the blocks which belong to the respective one of the complexes, predicting each block of a first predicted frame using block-by-block motion compensation, as a function of the directed displacements, predicting each block of a second predicted frame using object-related motion compensation, using a displacement vector calculated in accordance with the parameters calculated for the motion principle derived for one of the complexes, for each block of the first and second predicted frames, comparing the block to the corresponding block of the current frame to determine a respective prediction error in the location thereof, selecting one of block-by-block motion compensation and object-related motion compensation depending on the relative size of the prediction errors associated with the corresponding blocks of the first and second predicted frames, and applying a signal corresponding the selected motion compensation to the predictor.

5. A method as in claim 4, further comprising the step of performing a correct-motion interpolation of possibly uncoded and untransmitted partial and full frames using selected and transferred displacement vectors from a decoder to which the signal is being sent.

6. A method as in claim 4, wherein the steps of comparing and selecting include the steps, for each block, of: (a) ascertaining by interval calculation whether object-related motion compensation or block-by-block motion compensation produces the smaller prediction error and (b) selecting the motion compensation which produces the smaller prediction error.

7. A method as in claim 6, further comprising the step of weighting the selection of motion compensation in favor of object-related motion compensation.

8. A method as in claim 6, wherein the step of calculating the parameters of the motion principle comprises the step of calculating the parameters of the motion principle solely from ascertained displacements of corners of the contents of the current frame.

9. A method as in claim 6, further comprising the step of performing a correct-motion interpolation of possibly uncoded and untransmitted partial and full frames using selected and transferred displacement vectors from a decoder to which the signal is being sent.

10. A method as in claim 4, wherein the steps of comparing and selecting include the steps, for each block, of: (a) ascertaining by interval calculation whether object-related motion compensation or block-by-block motion compensation produces the smaller prediction error, (b) ascertaining whether prediction error produced by no displacement and by a nullification of the prediction leads to smaller prediction errors, and (c) selecting for motion compensation the one of object-related motion compensation, block-by-block motion compensation, no displacement and nullification of the prediction which produces the smallest prediction error.

11. A method as in claim 10, further comprising the step of weighting the selection of motion compensation in favor of object-related motion compensation.

12. A method as in claim 10, wherein the step of calculating the parameters of the motion principle comprises the step of calculating the parameters of the motion principle comprises the step of calculating the parameters of the motion principle solely from ascertained displacements of corners of the contents of the current frame.

13. A method as in claim 10, further comprising the step of performing a correct-motion interpolation of possibly uncoded and untransmitted partial and full frames using selected and transferred displacement vectors from a decoder to which the signal is being sent.

* * * * *